United States Patent [19]
Luft

[11] 3,750,834
[45] Aug. 7, 1973

[54] STEERING SYSTEM
[75] Inventor: Robert G. Luft, Wildwood, Ill.
[73] Assignee: International Harvester Company, Chicago, Ill.
[22] Filed: Dec. 22, 1971
[21] Appl. No.: 210,662

Related U.S. Application Data
[63] Continuation-in-part of Ser. No. 52,940, July 7, 1970, abandoned.

[52] U.S. Cl............... 180/79.2 C, 60/52 S, 180/45, 180/77 S
[51] Int. Cl.............................................. B62d 5/06
[58] Field of Search .................. 180/79.2 R, 79.2 B, 180/79.2 C, 45, 46, 47, 77 S; 60/52 S

[56] References Cited
UNITED STATES PATENTS
3,202,238  8/1965  Strader........................... 180/79.2 C
3,390,735  7/1968  Medley et al. ................. 180/79.2 B
3,482,643  12/1969  Ivy .................... 180/79.2 C
3,556,243  1/1971  Susag............................ 180/79.2 C
3,604,528  9/1971  Williamson .................... 180/79.2 C
3,185,245  5/1965  Hoyt.............................. 180/79.2 C Primary Examiner—Leo Friaglia
Assistant Examiner—Leslie J. Paperner
Attorney—Floyd B. Harman

[57] ABSTRACT

A steering system for a vehicle having a pair of steerable axles and an operator's station at each end. The system provides a means for steering the vehicle from either station and provides a means for selectively steering the vehicle in any one of three different modes.

16 Claims, 5 Drawing Figures

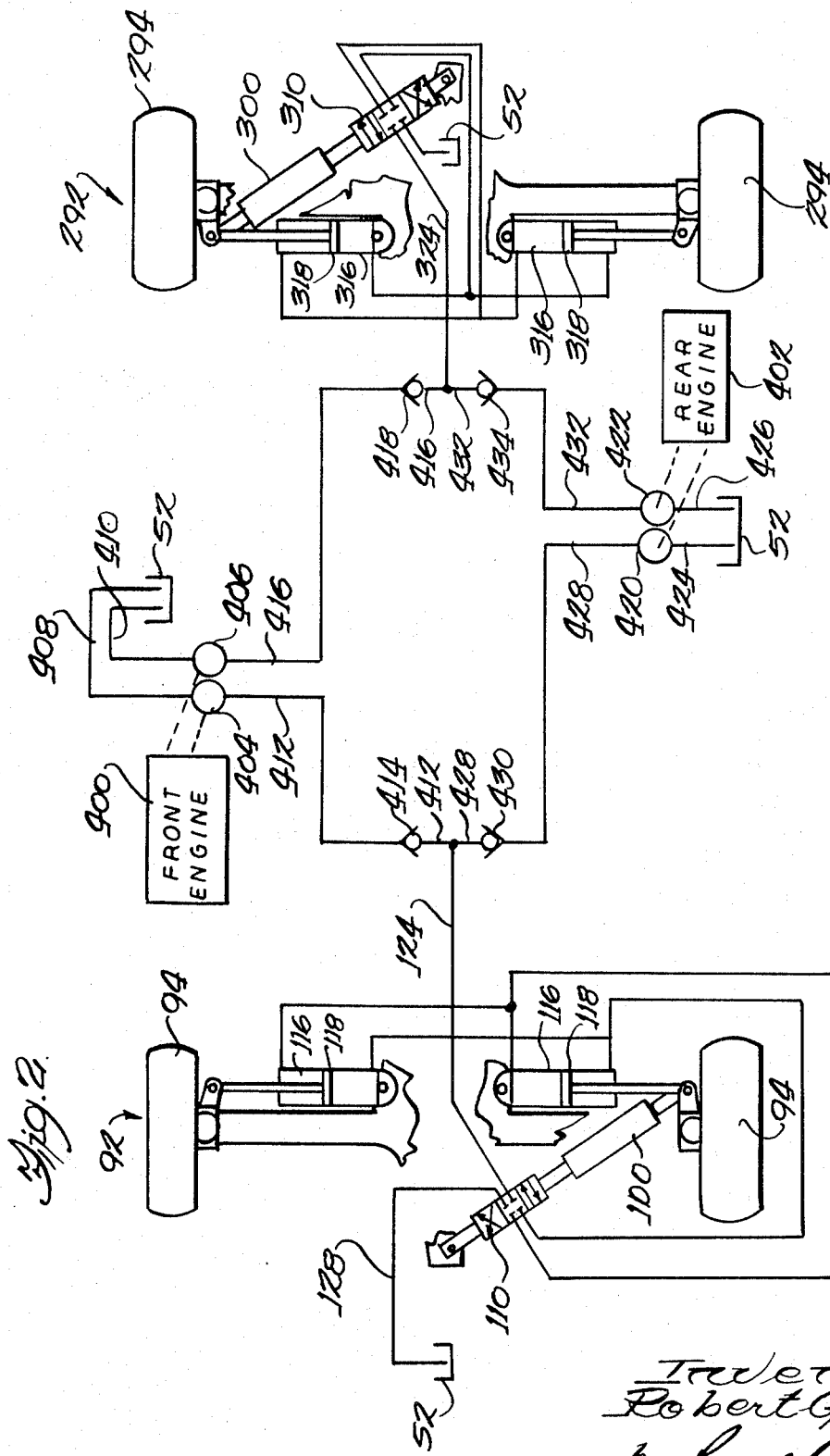

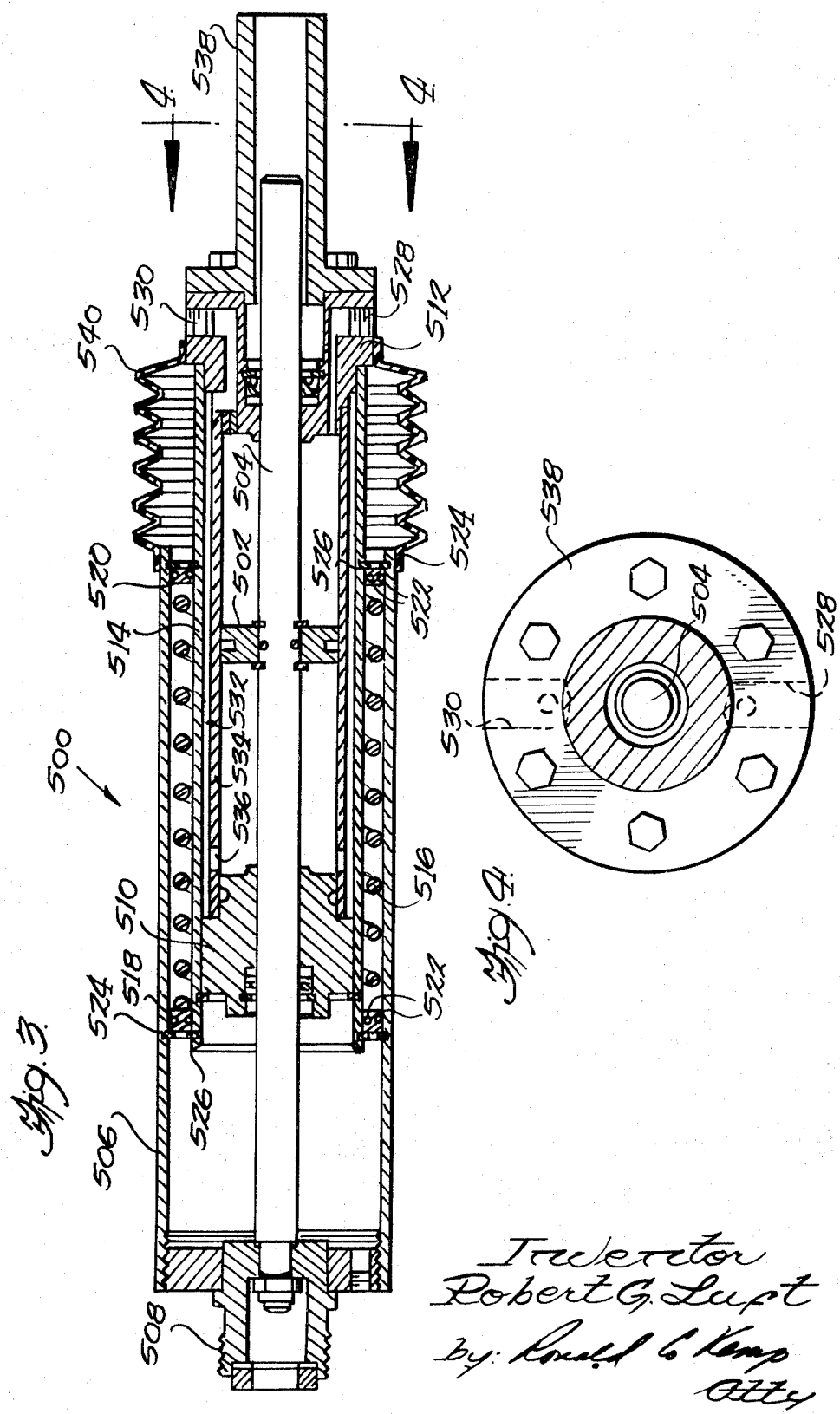

ROBERT G. LUFT
INVENTOR.

BY Ronald C. Kamp 3,750,834

STEERING SYSTEM

CROSS REFERENCE TO RELATED APPLICATION

This application is a continuation-in-part of Ser. No. 52,940, filed July 7, 1970, now abandoned.

This application is related to that disclosed and claimed in the application of Robert G. Luft and Edward A. Bott entitled DRIVE TRAIN FOR LOW PROFILE VEHICLE, Ser. No. 796,371 filed Feb. 4, 1969, now Pat. No. 3,614,989.

BACKGROUND AND SUMMARY OF THE INVENTION

In certain large vehicles, such as those utilized to tow the jumbo jet aircraft, the size of the machine requires a control compartment or operator's station at each end thereof. Such dual operator stations are provided so that the operator may be positioned at the forward end of the vehicle regardless of its direction of travel, thus providing the operator with optimum visibility in that direction. These dual stations impose a requirement for steering the vehicle from two different locations. Since vehicles of this type are maneuvered in close proximity to aircraft, damage to which must be avoided, it is highly desirable to permit the operator to select different modes of steering for the vehicle. This is especially advantageous when the vehicle itself is quite large and the turning radius with only one mode of steering may, in some situations, be too large, and in other situations, may be too sharp.

It is, therefore, an object of the present invention to provide a means for steering a vehicle in either one of three different modes.

It is also an object of this invention to provide a means for steering a vehicle from either one of dual operator stations.

Still another object of this invention is to provide a means for steering the vehicle which permits selection of either one of two operator stations and the selection of either four-wheel coordinated steer, two-wheel steer, or four-wheel crab steer from the selected station.

It is still another object of this invention to provide a means for supplying hydraulic fluid under pressure for the steering system of a vehicle having a pair of engines so that the steering system is operable when only one of the two engines is running.

It is still another object of this invention to provide a hydraulic steering circuit for a vehicle having a pair of engines and a pair of steerable axles so that both axles may be steered whenever either one of the dual engines is operating.

It is still another object of this invention to provide a sensing cylinder for the steering system on a vehicle having a plural mode steering capability which will automatically return the wheels to a straight-ahead position when a mode of steering is selected which dictates such an attitude.

A still further object is to provide a sensing cylinder which both assists the initiation of steering and controls the position of a valve directing hydraulic fluid to the steering rams.

A further object of this invention is to provide a sensing cylinder which offers minimum resistance to movement from a static position.

These, and other objects of the present invention, and many of its attendant advantages, will become more readily apparent upon a perusal of the following description and the accompanying drawings, wherein:

FIG. 2 is a schematic view of a preferred arrangement for providing hydraulic fluid under pressure to the steering rams;

FIG. 3 is a cross sectional view of a preferred embodiment of sensing cylinder utilized in the system shown in FIG. 1;

FIG. 4 is a cross sectional view taken on line 4—4 of FIG. 3; and

DESCRIPTION OF A PREFERRED EMBODIMENT

Figure 1:
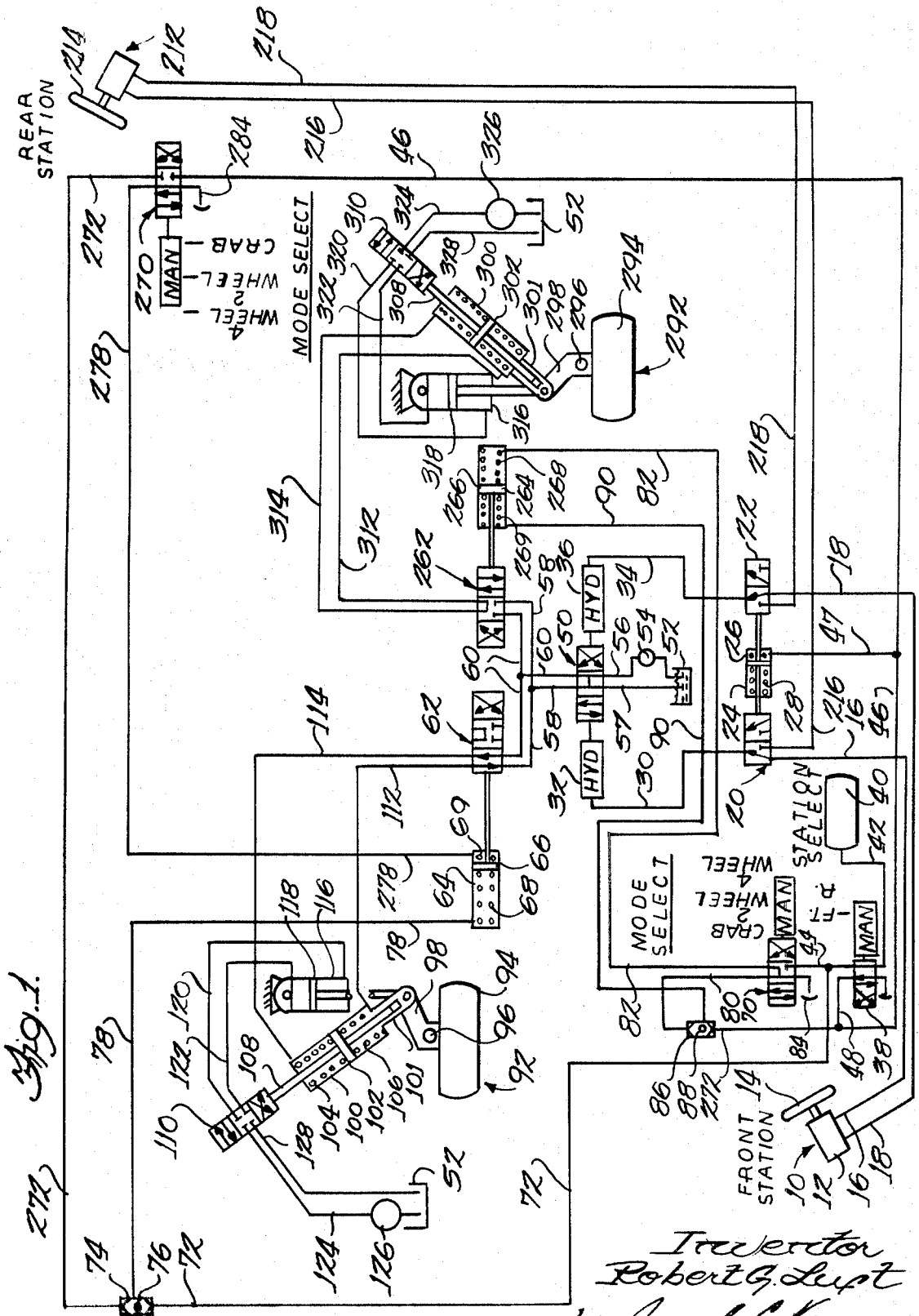
FIG. 1 is a schematic representation of a steering system according to the present invention.

Referring now to FIG. 1, a vehicle, not shown but which may be of the type disclosed in patent application Ser. No. 796,371 filed Feb. 4, 1969, is provided with a control compartment or operator's station at the front, indicated generally at 10, and a similar station 12 at the rear of the vehicle. The front station 10 includes a hand pump 12 connected with and operated by a steering wheel 14. The rear station has a similar hand pump 212 connected with and driven by the steering wheel 214. Conduits 16 and 18 connect with the hand pump 12 and with one of the hand pump selector valves 20 and 22, respectively. Conduits 216 and 218 connect with the hand pump 212 in the rear station and with the hand pump selector valves 20 and 22, respectively. The valves 20 and 22 are of the three-port, two-position type, with their positions selected by a position cylinder 24, which includes a piston 26 connected with the valves 20 and 22. A spring 28 biases the piston 26 to the position shown in FIG. 1, which position renders the rear hand pump 212 inoperable since the conduits 216 and 218 are blocked by the valves 20 and 22. In this position, the conduit 16 communicates with a conduit 30 connected with a hydraulic actuator 32 and the conduit 18 communicates with a conduit 34 connected with a hydraulic actuator 36.

The position of the piston 26 within the cylinder 24 is determined by the station selector valve 38 located in the front station 10. The station selector valve 38 is of the four-part, two-position type and connects with a reservoir 40 containing air under pressure through a conduit 42. Conduits 44 and 46 connect with the selector valve 38 as does a conduit 48 which is vented to atmosphere. Branch conduit 48 connects with the conduit 46 and with the cylinder 24. With the station selector valve positioned to select the front station, as shown in FIG. 1, the conduits 47 and 46 are vented to atmosphere through conduit 48. This permits the spring 28 to shift the piston 26 toward the right as viewed in FIG. 1 connecting the conduits 16 and 18 from the front hand pump 12 with the conduits 30 and 34. When the station selector valve 38 is shifted to the right as viewed in FIG. 1 to permit steering control by the steering wheel 214, the conduit 44 is connected with the exhaust conduit 48 and pressure from the reservoir 40 is permitted to flow through conduits 46 and 47 to the cylinder 24. Pressure acting on the piston 26 will shift the piston and both valves 20 and 22 to the left. In this position the valves 20 and 22 block the conduits 16 and 18 and connect the conduits 216 and 218 with the conduits 30 and 34, respectively.

Regardless of which station has been selected by manipulation of the station selector valve 38, hydraulic pressure will appear in one of the conduits 30 and 34 depending upon the direction of rotation of the steering wheel 14 or 214 in the selected station. The hydraulic actuators 32 and 36 are connected with a three-position directional flow valve 50. Hydraulic fluid under pressure is provided to the valve 50 from a reservoir 52 by a hydraulic pump 54 which communicates with the valve 50 through a conduit 56. A return conduit 57 connects with the valve 50 and the reservoir 52. Each of the conduits 58 and 60 are branched to permit connection with each of two mode control valves 62 and 262 when the rotation of either of the pump 12 or 212 provides hydraulic pressure in conduit 30 the hydraulic actuator 32 will shift the direction flow valve 50 to the right, i.e., to the right of the position shown in FIG. 1, in which the conduit 56 will be connected with the conduit 60 and the conduit 58 with the conduit 57. When the rotation of either of the hand pumps 12 or 212 is in a direction to provide hydraulic pressure in line 34, the hydraulic actuator 36 will shift the direction flow valve 50 to the left as viewed in FIG. 1, wherein conduit 56 will be connected with conduit 58 and conduit 60 will be connected with conduit 57.

The mode control valves 62 and 262 are of the three-position, four-port type and their position is determined by mode control cylinders 64 and 264. Each of the mode control cylinders 64 and 264 are provided with pistons 66 and 266 which are connected with the mode control valve 62 and 262, respectively. The piston 66 is urged toward a centered position within the cylinder 64 by means of springs 68 and 69, while the piston 266 is urged toward a center position within its cylinder 264 by means of springs 268 and 269. Each of the pistons 66 and 266 are capable of assuming three different positions within the cylinder. That is, each can be centered, fully extended or fully retracted. The position of the mode control cylinders is determined in part by the station selector valve 38 and in part by a mode selector valve 70 which is located in the front station 10 or by the similar mode selector valve 270 located in the rear station 12.

Each of the mode selector valves 70 and 270 are of the three-position, four-port type and when centered provide for two wheel steer from the wheels adjacent the operator's station selected by the station selector valve 38, and are shiftable from the centered position in one direction to provide crab steering of all four wheels and in the other direction to provide coordinated steering of all four wheels. The mode selector valve 70 is operable only when the station selector valve 38 is positioned for front station operation, while the mode selector valve 270 is operable only when the station selector valve 38 has been moved to the rear position. When the station selector valve is in front position, as shown in FIG. 1, air pressure is provided from the air reservoir 40 through the conduits 42 and 44 to a conduit 72 which connects with the conduit 44. Conduit 72 connects with a double-seated T connector 74 containing a ball check valve 76. A conduit 78 communicates with the T connector 74 at a point intermediate the two seats and with the head end side of the cylinder 64. The presence of air pressure in the head end side of the cylinder 64 will cause the piston 66 to be shifted to the right against the bias of the spring 69. Regardless of the position of the mode selector valve 70, the piston 66 in the mode control cylinder 64 will be in its extended position since air pressure is directed to the head end side of the cylinder by the station selector valve 38. The mode selector valve 70 then is utilized to direct pressure selectively to either end of the mode control cylinder 264 in order to determine what mode of steering will be utilized. In the position shown in FIG. 1, the mode selector valve has been centered so that the conduit 44 which receives air pressure from the reservoir 40 has been blocked. Two conduits 80 and 82 connected with the mode selector valve 70 are in communication with a conduit 84 which exhausts to atmosphere. The conduit 80 connects with a double-seated T connector 86 having a ball check valve 88. A conduit 90 communicates with the T connector at a point intermediate the seats and with the rod end side of the mode control cylinder 264. The conduit 82 connects with the head end side of the cylinder 264. With both the conduits 90 and 82 being exhausted to atmosphere through the conduit 84, the springs 268 and 269 within the cylinder 264 will cause the piston 266 to be centered. When the mode selector valve 70 is moved to the crab position, or to the left as viewed in FIG. 1, conduit 44 will be connected with the conduit 80 while the conduit 82 will be exhausted to atmosphere through the conduit 84. Air pressure will be directed through the conduits 42, 44, 80 and 90 to the rod end side of the cylinder 264. The head end side of the cylinder will be exhausted to atmosphere through the conduits 82 and 84. The presence of high pressure in the rod end side of the cylinder will cause the piston 266 to be retracted moving the mode control valve 262 to the right as viewed in FIG. 1. When the mode selector valve 70 is moved to the four-wheel position, the conduit 44 will be connected with the conduit 82 while the conduit 80 will be exhausted to atmosphere through the conduit 84. Air pressure will therefore be directed through the conduit 82 to the head end side of the cylinder 264 causing the piston 266 to be extended and the mode control valve 262 to be moved to the left.

The mode selector valve 270 in the rear station 212 is provided with an exhaust conduit 284 and with a conduit 272 which communicates with the T connector 74 opposite the connection of the line 72 therewith. Another conduit 278 connects with the valve 270 and with the rod end side of the cylinder 64. With the station selector valve in the front position, manipulation of the mode selector valve 270 will be completely ineffective because the conduit 46 is connected with atmosphere through conduit 48 and the presence of air pressure in the conduit 72 will cause the ball 76 to seat against the conduit 272. When the station selector valve 38 is moved to the rear position air pressure will be directed to the conduit 46 and to a conduit 272 which connects with the conduit 46 and with the T connector 86 on the side opposite the connection of the conduit 80 therewith. The presence of air pressure in the conduit 272 will seat the ball check valve 88 against the conduit 80 and permit air pressure to pass through the conduit 90 to the rod end side of the cylinder 264. The piston 266 will be retracted moving the mode control valve 262 to the right as viewed in FIG. 1. This position of the mode control cylinder will be maintained as long as the station selector valve is in the rear position irrespective of the manipulation of the mode selector valve 270 in the rear station. The mode selector valve 270 will therefore direct air pressure to the selected ends of the mode control cylinder 64 in order to determine the position of the mode control valve 62, which will determine the mode of steering for the vehicle. In its centered two-wheel position, the mode selector valve 270 will connect both conduits 78 and 72 with the atmosphere through the conduit 284. This will permit the springs 68 and 69 in the cylinder 64 to center the piston 66 and the valve 62. When the mode selector valve is shifted to the crab position, conduit 46 will be connected with the conduit 272 while the conduit 278 will be connected with atmosphere through the conduit 284. The presence of high pressure in the head end of the cylinder 64 will cause the piston 66 to be extended moving the mode control valve 62 to the right. When the mode selector valve 270 is moved to the four-wheel position, the conduit 46 will be connected with the conduit 278 while the conduit 272 will be vented to atmosphere through the conduit 284. The presence of high pressure in the conduit 278 will cause the piston 66 to be retracted moving the valve 62 to the left. With the station selector valve 38 in the rear position, manipulation of the mode selector valve 70 in the front station 10 will have no effect on either of the mode control cylinders 64 and 264. This is because the conduit 44 is vented to atmosphere through the conduit 48 and the presence pressure in the conduit 272 causes the ball check valve 88 to be seated sealing off the conduit 80.

Considering first the front axle, which is indicated generally at 92, a pair of steerable wheels, one of which is shown a5 94 is pivotable about an upright axis defined by the pin 96 through a steering arm 98. A sensing cylinder 100 includes a piston 102 which is centered within the cylinder by means of springs 104 and 106. A piston rod 108 is connected to the piston 102 and extends in each direction beyond the piston to provide equal displacements. One end of the rod is connected with a main power steering valve 110. The cylinder 100 has an extension 101 which is pivotally connected to the steering arm 98. A conduit 112 extends from the mode control valve 62 to one end of the cylinder 100 and a second conduit 114 extends from the mode control valve 62 to the other end of the cylinder 100. A steering ram 116 has a piston 118 which is pivotally attached to the steering arm 98. A conduit 120 connects with the main power steering valve 110 and with the rod end side of the cylinder 116 and a second conduit 112 connects between the valve 110 and the head end side of the cylinder 116. A conduit 124 provides a connection between the main steering pump 126 and the valve 110. Another conduit 128 provides a return from the valve 110 to the reservoir 52. When hydraulic pressure is present in the conduit 114, the piston 102 and the rod 108 will be shifted against the bias of the spring 106 toward the right causing the valve 110 to shift in that direction. Since the movement of the valve 110 is limited to a small fraction of an inch, the piston 102 will become fixed and the cylinder 100 will be moved upward and to the left. The steering arm 98 and the wheel 94 will be pivoted counterclockwise. Movement of the piston rod 108 in this direction will cause the main power steering valve 110 to be moved downward and to the right, whereby the conduit 124 will be connected with the conduit 120 while the conduit 122 will be connected with the reservoir through the conduit 128. The pressure in conduit 120 will be communicated to the head end side of the ram 116 causing the piston 118 to be retracted. Retraction of the piston 118 will also cause the wheel 94 to be pivoted in a counterclockwise direction about the pivot pin 96. The presence of pressure in the conduit 112 will have the opposite effect. That is, the piston 102 will be shifted upward and the cylinder 100 will be shifted downward causing the wheel 94 to be pivoted clockwise, while simultaneously shifting the valve 110 so that the conduit 124 is connected with the conduit 122 and the conduit 120 with the conduit 128. The hydraulic fluid from the pump 126 will then be available to extend the piston 118 and assist the sensing cylinder in turning the wheel 94 counterclockwise. The end to which and the amount of pressure admitted to the sensing cylinder by the valve 50 is determined by the direction and degree of rotation of the hand pump. Once the wheel 94 has attained a position such that the force of the compressed spring within the cylinder is equal to this pressure, the next incremental movement of the steering ram will create a greater spring force which will urge the valve 110 to its center position, although not completely centering the piston 102 within the cylinder 100. One of the springs will, therefore, be compressed. With the valve 110 centered the steering action will cease and the steering ram hydraulically locked in position.

The action of the rear axle components numbered 292-328 are identical with that of the comperable components with corresponding reference numbers of value 200 less on the front axle. However, when the selected station has been in either crab or 4-wheel steer and the mode selector valve in that station is moved to 2-wheel steer the mode control cylinder on the end opposite the selected station with be centered causing the associated mode control valve to be centered. In its centered position, the mode control valves connect the two conduits leading to the sensing cylinder. If the axle on the end opposite the selected station has its wheels in other than the straight ahead position, the interconnection of the two ends of the sensing cylinder will permit the springs therein to attempt to center the piston within the cylinder. This action will shift the main power steering valve in a direction to direct hydraulic fluid from the main power steering pump to the steering ram in order to pivot the wheels to a straight ahead position.

Referring now to the preferred manner of supplying the hydraulic fluid for the main power steering valves shown in FIG. 2, the vehicle is provided with a front engine 400 and a rear engine 402. A pair of pumps 404 and 406 are driven by the front engine 400. The pumps 404 and 406 are connected with the reservoir through conduits 408 and 410, respectively. A conduit 412 connects with the output of the pump 404 and connects with the conduit 124 communicating with the main power steering valve 110. A one-way check valve 414 is provided in the conduit 412 and permits fluid flow only from the pump 404 toward the conduit 124. A conduit 416 connects with the pump 406 and with the conduit 324 leading to the main power steering valve 310 on the rear axle. A one-way check valve 418 is provided in the conduit 416 and permits fluid flow only from the pump 406 to the conduit 324. A pair of pumps 420 and 422 are driven by the rear engine 402. Conduits 424 and 426 connect between the reservoir 52 and the pumps 420 and 422, respectively. A conduit 428 connects with the output of pump 420 and with the conduit 124. A one-way check valve 430 is provided in the conduit 428 and permits fluid flow only from the pump 420 toward the conduit 124. A conduit 432 connects with the pump 422 and with the conduit 324. A one-way check valve 434 is provided in the conduit 432 and permits fluid flow only from the pump 422 toward the conduit 324.

The pump arrangement described above, will provide hydraulic fluid under pressure to both of the conduits 124 and 324 even though only one of the engines 400 and 402 are operating. This permits all three modes of steering, which necessitates actuation of both axles for the crab steer and four-wheel steer modes, when one engine has been disabled or is otherwise not functioning. The pumps 404, 406, 420 and 422 replace the pumps indicated by the numerals 126, 326 and 54 in the system shown in FIG. 1. While FIG. 2 shows the connections necessary to replace the pumps 126 and 326, it will be obvious to one of skill in the art that one of the two pumps 404 and 406 and one of the two pumps 420 and 422 may be joined with a double check valve arrangement to supply hydraulic fluid to the conduit 56 of FIG. 1.

Referring now to the preferred form of sensing cylinder, which would be utilized for the components indicated by the numeral 100 and 300 in the embodiments of FIGS. 1 and 2, the sensing cylinder indicated generally at 500 is provided with a piston 502 which is sealingly secured by conventional means to a piston rod 504. The piston rod 504 extends on either side of the piston 502 a sufficient distance in order to provide equal displacement of hydraulic fluid in both directions of movement. One end of the piston rod is secured to an outer sleeve 506 and through a coupling means 508 to the main power steering valve, such as those indicated by the reference numerals 110 and 310 in FIG. 1. A pair of glands 510 and 512 are slidable on the piston rod 504 and are provided with conventional seals to prevent leakage therebetween. An outer tube 514 is secured between the two glands 510 and 512. A compression spring 516 is positioned within the sleeve 506 and encircles the outer circumference of the tube 514. A pair of spacer elements 518 and 520 are positioned between the sleeve 506 and the outer tube 514 and are engageable by the compression spring 516. Each of the spacer elements 518 and 520 are provided with inserts 522, which preferably are of a low static coefficient of friction material such as polytetrafluroethylene, and are engageable with the inner surface of the sleeve 506 and the outer surface of the outer tube 514. The spacers serve to position the outer tube 514 with respect to the sleeve 506 and the inserts 522 readily permit relative sliding between the spacers 518 and 520 and the sleeve 506 and the tube 514. A pair of snap rings 524 are positioned on the outer sides of the spacers 518 and 520 and engage grooves formed on the inner periphery of the sleeve 506. A similar pair of snap rings 526 engage grooves formed in the outer surface of the outer tube 514. The compression spring 516 urges the spacer elements into contact with the snap rings 524 and 526. Movement of the tube 514 in either direction relative to the sleeve 506 will cause compression of the spring 516. A port 528 in the gland 512 provides fluid communication to the right hand side of the piston 502 as viewed in FIG. 3. Fluid communication to the other side of the piston 502 is provided through a port 530 which communicates with an annular space 532 formed by an inner tube 534 secured between the glands 510 and 512 and having a smaller radius than the inner surface of the outer tube 514. The piston 502 sealingly engages the inner surface of the inner tube 534. Openings 536 permit fluid communication between the interior of the inner tube 534 and the annular space 532.

It can be seen that if the piston rod 504 is restrained, the admission of hydraulic fluid under pressure through the port 528 will cause the glands 512 and 510 and the tubes 514 and 534 to be moved toward the right as viewed in FIG. 3, while the admission of hydraulic fluid pressure through the port 530 will cause both tubes and both glands to move as a unit to the left. A connector member 538 is secured to the gland 512 and is pivotally connectable to one of the steering arms such as 98 or 298.

As explained previously with respect to the inserts 522, it is important that the sensing cylinder be readily actuated in order to provide good steering sensitivity, and for this reason it is highly desirable to maintain friction between the moveable parts at a minimum. Since corrosion is a large contributing factor to friction, means are provided to minimize the possibility of corrosion. For this purpose, a collapsible boot 540 is secured at one end to the outer surface of the sleeve 506 and at its other end to the gland 512. This boot 540 precludes the entrance of contaminants to the outer surface of the outer tube. In addition, the frictional forces are maintained at a minimum by chrome plating the inner surface of the sleeve 506 and the outer surface of the outer tube 514. This permits the polytetrafluroethylene rings 522 to be in contact with a smooth surface of relative corrosion resistance and maintains the coefficient of friction between the teflon rings 522 and the surfaces at a minimum.

Figure 5:
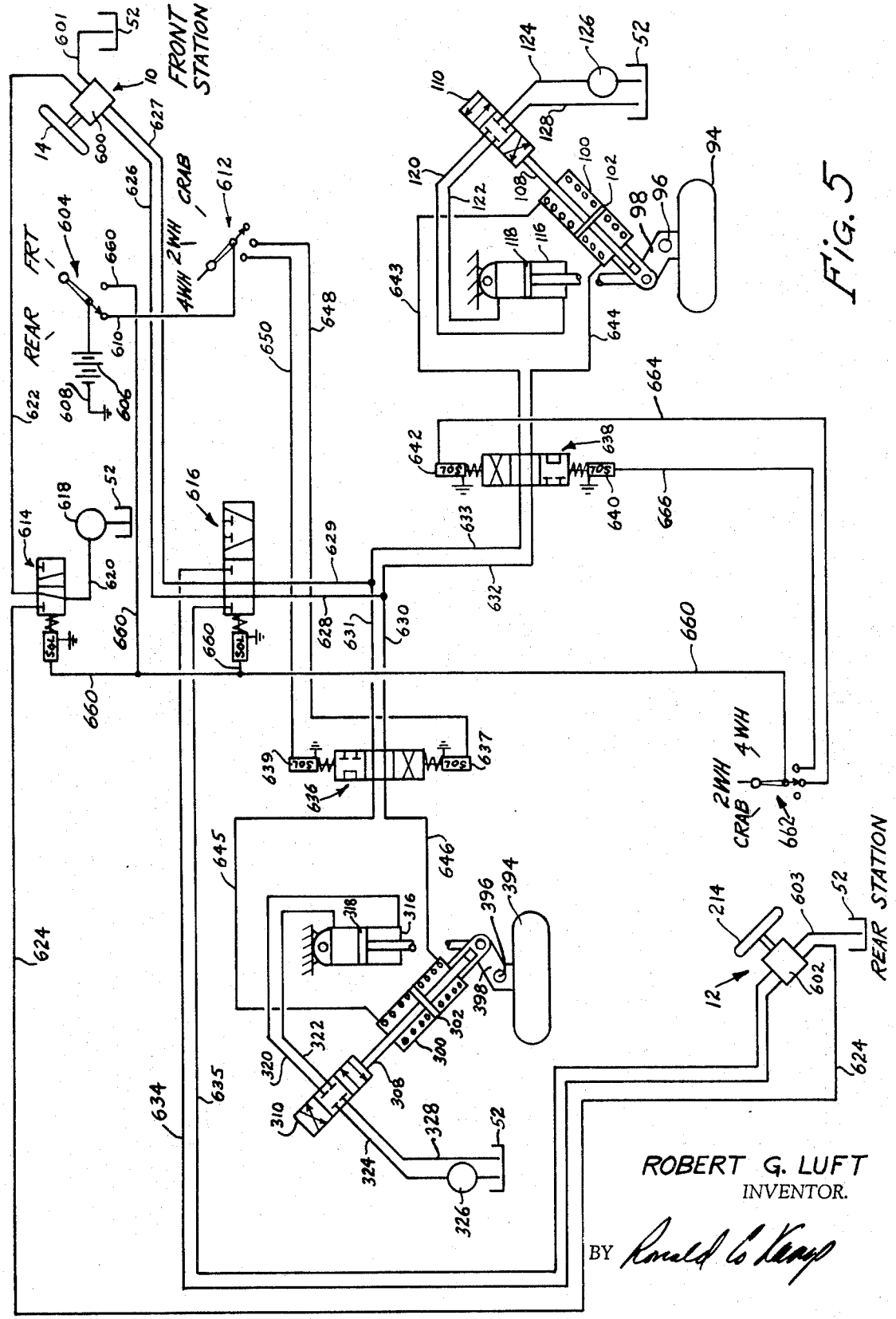
FIG. 5 is a schematic representation of another embodiment of a steering system according to the present invention.

A second embodiment of the invention is shown in FIG. 5, in which the pneumatic control means are eliminated and replaced by electrical control means. In this embodiment, elements which remain basically the same as in the embodiment of FIG. 1 are referred to be the same reference numbers.

The front and rear stations 10 and 12 are provided with hydrostatic power steering units 600 and 602 respectively, which units are of the type that include a hand pump and a directional control valve, and which may be of the type disclosed in U.S. Pat. No. 3,446,021 issued May 27, 1969 to Richard J. Lech, for example. The front station 10 is provided with a station selector switch 604 to which electrical energy from a source, such as a battery 606, is directed by conductor 608. The switch 604 has two positions, and in the FRONT position, as shown in FIG. 5, connects conductor 608 with a conductor 610 which leads to a front steering mode control switch 612. With the station selector switch 604 in the FRONT position, the solenoids for the power pump valve 614 and the steering pump valve 616, both of which are two-position valves, are inactivated and both valves are biased to the positions shown in FIG. 5. In this position, the power pump valve 614 is oriented to connect a conduit 620 leading from the power pump 618 with a conduit 622 which communicates with the hydrostatic unit 600, while blocking a conduit 624 communicating with the hydrostatic unit 602 in the rear station 12. Similarly, the steering pump valve 616 is oriented to connect conduits 626 and 627 leading from the hydrostatic unit 600 with conduits 628 and 629, while blocking the conduits 634 and 635 leading from the hydrostatic unit 602. The conduit 628 branches into conduit 630 leading to the rear mode control valve 636 and conduit 632 leading to the front mode control valve 638. Similarly, the conduit 629 branches into conduit 631 leading to the rear mode control valve 636 and conduit 633 leading to the front mode control valve 638.

Each of the mode control valves 636 and 638 is a three-position valve, spring centered and have a pair of solenoids to effect shifting thereof from center position, the rear mode control valve 636 having solenoids 637 and 639 and the front mode control valve 638 having solenoids 640 and 642. With the station selector switch 604 in FRONT position, the solenoids of the front mode control valve 638 cannot be energized and this valve is therefore centered. The actuation of solenoids 637 and 639 is controlled by the front mode control switch 612. With the switch 612 in the 4-wheel mode, as shown in FIG. 5, neither of the solenoids 637 and 639 are energized and the rear mode control valve 636 is centered also. Rotation of the steering wheel 14 in the front station 10 results in fluid pressure from the power pump 618 being directed through conduits 620 and 622 to one of the conduits 626 and 627, depending upon the direction wheel 14 is rotated, while the other of these conduits is connected with the reservoir 52 through conduit 601. The pressure in one of the conduits 626 and 627 will result in pressurization of either conduits 630 and 632 or conduits 631 and 633, while the other of these pair of conduits is connected with the reservoir 52.

With the front mode control valve 638 centered, conduits 632 communicates with conduit 644 leading to lower end of the cylinder 100 and conduit 633 connects with the conduit 643 leading to the upper end of the cylinder 100. Similarly, with the rear mode control valve 636 centered, conduit 631 connects with conduit 645 leading to the upper end of the cylinder 300 and conduit 630 connects with conduit 646 leading to the lower end of the cylinder 300. If hydraulic pressure is present in conduits 631 and 633, the upper ends of both cylinders 100 and 300 will be pressurized, moving the pistons 102 and 302 downward and the cylinders 100 and 300 upward. The front wheel 94 will be pivoted in a clockwise direction and the rear wheel in a counter-clockwise direction, in the same manner and for the same reasons given in connection with the embodiment of FIG. 1. When conduits 630 and 632 are high pressure, the wheels are pivoted in the opposite direction. Thus, 4-wheel coordinated steering of the vehicle is effected.

When the mode control switch 612 is moved to its 2-wheel position, the solenoid 637 is energized through conductor 648 causing the valve 636 to be moved downward. In this position, the conduits 630 and 631 are blocked and the conduits 645 and 646 are interconnected permitting the centering springs within the cylinder 300 to shift valve 310, if necessary, and thereby pivot the rear wheels 394 to a straight ahead position as previously described with regard to the FIG. 1 embodiment. Rotation of the steering wheel 14 will then selectively direct pressure from the power pump 618 to one end of the cylinder 100 and two-wheel steering at the front end will be effected.

When the mode control switch 612 is moved to its CRAB position, the solenoid 639 will be energized through conductor 650 thereby causing the valve 636 to be shifted upward. In this orientation, the conduits 630 and 631 are connected with the conduits 645 and 646 respectively. Rotation of the steering wheel 14 thereafter will pressurize either the upper end of cylinder 100 and the lower end of cylinder 300 or the lower end of cylinder 100 and the upper end of cylinder 300. Thus, depending upon the direction of rotation of steering wheel 14, both front and rear wheels will be simultaneously pivoted clockwise or simultaneously pivoted counterclockwise, thereby effecting crab steering of the vehicle.

When the station selector switch 604 is moved to its REAR position, the front steering wheel is rendered inactive because the solenoids for both the poser pump valve 614 and the steering pump valve 616 are energized through a conductor 660. With the power pump valve 614 shifted, conduit 622 is blocked and the power pump 618 is connected through conduits 620 and 624 with the hydrostatic unit 602 in the rear station 12. Similarly, shifting the steering pump valve 616 blocks the conduits 626 and 627 leading from the front hydrostatic unit 600, while converting the conduits 634 and 635, leading from the rear hydrostatic unit 602, with the conduits 629 and 628 respectively. Energizing the conductor 660 provides electrical energy to the rear mode control switch 662. The actuation of the solenoids 640 and 642 connected with the front mode control valve 638 is controlled by the rear mode control switch 662. With the switch 662 in the 4-wheel mode, neither of the solenoids 640 and 642 are energized and the front mode control valve 638 is centered. Since the solenoids 637 and 639 cannot be energized when the station selector switch 604 is in its REAR position, the rear mode control valve 636 will be centered also. Rotation of the rear steering wheel 214 will, therefore direct pressure from the power pump 618 to one of the conduits 634 and 635 and hence to one of conduits 629 and 628, while connecting the other of these pairs to reservoir through conduit 603. Either the upper ends of cylinders 100 and 300 will be pressurized or the lower ends of both cylinders will be pressurized causing the wheels 94 and 394 to be pivoted in opposite directions. This will provide 4-wheel coordinated steering of the vehicle.

Moving the rear mode control switch 662 to its 2-wheel position, as shown in FIG. 5, will cause the solenoid 642 to be energized through conductor 664, shifting the front mode control valve 638 upward. The conduits 632 and 633 will then be blocked and the conduits 643 and 644 will be connected permitting the front wheels to be centered, as previously described with regard to the rear wheels. Rotation of the rear steering wheel 214 will thereafter provide 2-wheel steering at the rear of the vehicle.

With the rear mode control switch 662 in its CRAB position, the solenoid 640 will be energized through the conductor 666, causing the front mode control valve 638 to be shifted downward. In this position, the conduits 632 and 633 are connected with the conduits 643 and 644 respectively. Rotation of the rear steering wheel 214 will selectively pressurize either the lower end of cylinder 300 and the upper end of cylinder 100 or the upper end of cylinder 300 and the lower end of cylinder 100 causing the wheels 394 and 94 to be simultaneously rotated clockwise and counterclockwise respectively. Thus, crab steering of the vehicle will be provided.

While preferred embodiments have been disclosed with respect to the general steering system and component portions thereof, it is to be understood that various changes and modifications may be made without departing from the spirit of the invention as defined by the scope of the appended claims.

What is claimed is:

1. In a vehicle having a pair of engines and a pair of steerable axles including at least one power steering ram on each, the improvement comprising:
   first and second pumps driven by one engine;
   third and fourth pumps driven by the other engine;
   said first and third pumps being connected to supply fluid pressure for the power steering ram on one axle; and
   said second and fourth pumps being connected to supply fluid pressure for the power steering ram on the other axle;
   whereby both axles are steerable when either one of the engines is operating.

2. The invention according to claim 1, and further comprising:
   first check valve means for precluding flow between the first and third pumps; and
   second check valve means for precluding flow between said second and fourth pumps.

3. The invention according to claim 2, and further comprising:
   first directional flow control valve means for directing fluid from said first and third pumps to a selected end of the steering ram on said axle; and
   second directional flow control valve means for directing fluid from said second and fourth pumps to a selected end of the steering ram on the other axle.

4. The invention according to claim 3, and further comprising:
   a first sensing cylinder connected to and capable of shifting said first valve means;
   a second sensing cylinder connected to and capable of shifting said second valve means.

5. A selectable mode steering system for a vehicle having a pair of steerable axles, comprising:
   a first hand pump capable of manipulation by an operator;
   a directional flow control valve including hydraulic actuators communicating with the hand pump;
   a pilot pump communicating with said flow control valve;
   a first sensing cylinder connected to one axle and having each end in communication with said flow control valve;
   a first main power steering valve operably connected to the first sensing cylinder;
   first steering ram means having each end in communication with the first main power steering valve and operably connected to said one axle;
   a mode control valve communicating with said flow control valve;
   a second sensing cylinder operably connected to the other axle and having each end in communication with the mode control valve;
   a second main power steering valve operably connected to the second sensing cylinder;
   second steering ram means having each end in communication with the second main power steering valve and operably connected to said other axle;
   a mode control cylinder connected to said mode control valve; and
   a mode selector valve for directing fluid pressure to the mode control cylinder.

6. The invention according to claim 5, and further comprising:
   a second hand pump capable of manipulation by an operator;
   hand pump selector valve means for selectively communicating one of said first and second hand pumps with said flow control valve;
   position cylinder means operatively connected with the hand pump selector valve means;
   and a station selector valve for directing fluid pressure to or blocking fluid pressure from the position cylinder means in order to select one of the two hand pumps.

7. The invention according to claim 6, and further comprising:
   a second mode control valve interposed between said first sensing cylinder and said flow control valve;
   a second mode control cylinder operatively connected to said second mode control valve; and
   a second mode selector valve for directing fluid pressure to the second mode control cylinder.

8. The invention according to claim 7, wherein, said station selector valve selectively directs fluid pressure to one of said mode selector valve.

9. A selectable mode steering system for a vehicle having a pair of steerable axles, comprising:
   a first steering ram connected to one of the axles for power steering thereof;
   a first main power steering valve in fluid communication with each end of the first steering ram;
   a first sensing cylinder connected to said one axle and to the first main power steering valve to control the position thereof;
   a second steering ram connected to the other of said axles for power steering thereof;
   a second main power steering valve in fluid communication with each end of the second steering ram;
   a second sensing cylinder connected to said other axle and to the second main power steering valve to control the position thereof;
   pump means in fluid communication with the first and second power steering valves;
   mode control valve means in fluid communication with each end of the first and second sensing cylinders; and
   selector means to selectively position said mode control valve means to provide a plurality of modes of power steering for the vehicle.

10. The invention according to claim 9, and further comprising;
    a first operator station on the vehicle;
    a first hand control pump, capable of manipulation by an operator, located in said first station;
    said first hand pump being arranged to control the flow of hydraulic fluid to said mode control valve means.

11. The invention according to claim 10, and further comprising:
    a second operator station on the vehicle remote from said first station;
    a second hand control pump, capable of manipulation by an operator, located in said second station;

said second hand pump being arranged to control the flow of hydraulic fluid to said mode control valve means; and station selector means located in at least one of said stations and capable of selectively rendering one of said hand pumps inoperative.

12. A selectable mode steering system for a vehicle having a pair of steerable axles, comprising:
a first hydrostatic hand pump capable of manipulation by an operator;
a power pump in communication with said first hand pump and capable of supplying hydraulic fluid under pressure thereto;
first and second mode control valves in communication with said hand pump;
first and second sensing cylinders connected respectively with opposite axles and having each end in fluid connection with the first and second mode control valves respectively;
first and second main power steering valves connected to one end of said first and second sensing cylinders respectively;
first and second steering rams connected to opposite axles for power steering thereof and being in fluid communication with said first and second steering valves respectively;
pump means for supplying hydraulic fluid to said first and second steering valves;
electrical solenoid means associated with said mode control valves; and
first mode switch means for selectively energizing said solenoid means.

13. The invention according to claim 12, and further comprising:
a second hydrostatic hand pump capable of manipulation by an operator;
a power pump valve for connecting the power pump with one of said hand pumps while simultaneously isolating the other therefrom;
a steering pump valve for establishing connection between said mode control valves and one of said hand pump while simultaneously isolating the other.

14. The invention according to claim 13, wherein said power pump valve and said steering pump valve are solenoid actuated.

15. The invention according to claim 14, and further comprising:
a station selector switch for simultaneously energizing and de-energizing said solenoid actuated power and steering pump valves.

16. The invention according to claim 15, and further comprising:
second mode switch means for selectively energizing said solenoid means of said mode control valves;
said second mode switch means being rendered inoperative and said first switch means rendered operative when said solenoid actuated power and steering pump valves are de-energized; and
said first mode switch means being rendered inoperative and said second switch means rendered operative when said solenoid actuated power and steering pump valves are energized.

* * * * *